United States Patent
DeVal et al.

(10) Patent No.: US 7,916,643 B2
(45) Date of Patent: Mar. 29, 2011

(54) LIMITING EXTREME LOADS AT SESSION SERVERS

(75) Inventors: Gary John DeVal, Raleigh, NC (US); Curtis E. Hrischuk, Holly Springs, NC (US); Mark Johnson, Cincinnati, OH (US); Craig Andrew Lanzen, Lambertville, MI (US); James Winston Lawwill, Jr., Winchester, KY (US); Timothy Paul Pickett, Rochester, MN (US); Brian Pulito, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 11/937,701

(22) Filed: Nov. 9, 2007

(65) Prior Publication Data

US 2009/0122704 A1    May 14, 2009

(51) Int. Cl.
G01R 31/08 (2006.01)
(52) U.S. Cl. ....................................... 370/235
(58) Field of Classification Search .................. 370/235, 370/242, 253
See application file for complete search history.

(56) References Cited

U.S. PATENT DOCUMENTS

| | | | |
|---|---|---|---|
| 6,038,218 A | 3/2000 | Otsuka et al. | |
| 6,259,776 B1 | 7/2001 | Hunt | |
| 6,707,792 B1 | 3/2004 | Volftsun et al. | |
| 6,813,264 B2 | 11/2004 | Vassilovski | 370/352 |
| 6,870,848 B1 | 3/2005 | Prokop | 370/395.2 |
| 7,187,651 B1 | 3/2007 | Volftsun et al. | |
| 7,269,655 B2 | 9/2007 | Kim | 709/228 |
| 7,441,429 B1 * | 10/2008 | Nucci et al. | 70/229 |
| 2006/0067231 A1 | 3/2006 | Ikoma et al. | |
| 2006/0245359 A1 | 11/2006 | Hosein | |
| 2007/0070989 A1 | 3/2007 | Savoor et al. | |
| 2008/0002576 A1 | 1/2008 | Bugenhagen et al. | |
| 2008/0049615 A1 | 2/2008 | Bugenhagen | |
| 2008/0117816 A1 | 5/2008 | Stone et al. | |
| 2008/0192628 A1 * | 8/2008 | Williams | 370/230 |
| 2008/0198748 A1 | 8/2008 | Gilfix et al. | |
| 2009/0092111 A1 | 4/2009 | Horn et al. | |

OTHER PUBLICATIONS

Malas, SIP Performance Metrics, Network Working Group Internet Draft, Jun. 1, 2006.*
Office Action for U.S. Appl. No. 11/937,748 dated Nov. 10, 2009.
Office Action from U.S. Appl. No. 11/937,748 dated Mar. 16, 2010.

* cited by examiner

Primary Examiner — Kwang B Yao
Assistant Examiner — Jung Liu
(74) Attorney, Agent, or Firm — Robert A. Voigt, Jr.; Winstead, P.C.

(57) ABSTRACT

A method, system and computer program product for limiting extreme loads and reducing fluctuations in load at session servers. An admission rate controller of a SIP router calculates the "deflator ratio" equal to the average number of in-dialog messages received over a first fixed interval of time divided by the average number of out-of-dialog messages received over a second fixed interval of time. Further, the admission rate controller calculates the "dampening ratio" equal to the maximum number of messages allowed over a period of time divided by the number of messages admitted over a previous time interval. When an overload condition has been detected, the admission rate controller calculates the maximum number of out-of-dialog messages to be sent to its associated SIP server based on the deflator and dampening ratios. In this manner, a smoother transition from the overload condition to the non-overload condition may occur.

20 Claims, 5 Drawing Sheets

LIMITING EXTREME LOADS AT SESSION SERVERS

CROSS REFERENCE TO RELATED APPLICATIONS

The present invention is related to the following U.S. patent application which is incorporated herein by reference:

Ser. No. 11/937,748 entitled "Managing Bursts of Traffic in Such a Manner as to Improve the Effective Utilization of Session Servers" filed 11/09/2007.

TECHNICAL FIELD

The present invention relates to telecommunication networks, and more particularly to limiting extreme loads and reducing fluctuations in load at session servers and recovering from a failure of a Session Initiation Protocol (SIP) router or a session server in an efficient manner.

BACKGROUND INFORMATION

Telecommunication systems can be time based or packet based. For example, a wireless telephone or cell phone can communicate using a time based technique such as Code Division Multiple Access (CDMA). By contrast, the Internet is a packet based system which can support Internet Protocol (IP) telephony for allowing the real time delivery of voice and other multimedia services. Internet telephony, also known as Voice over Internet Protocol (VoIP), allows for the conversion and transmission of voice data from a time based system into a packet based system. VoIP services are convenient in that they allow users to communicate through the Internet using a personal computer. VoIP services have also merged with the time based system such as the standard PSTN to provide long distance telephony at reduced costs.

Internet technology is session based rather than connection based. The underlying foundation is an IP layer that makes a best effort to deliver packets, even though it provides unreliable connectionless service at the network layer. Session Initiation Protocol (SIP) is an application-layer control (signaling) protocol for creating, modifying, and terminating sessions with one or more participants. SIP is generally used to establish an Internet session and negotiate the capabilities of the session. The sessions can include Internet telephone calls, multimedia distribution, and multimedia conferences. In general, SIP invitations are used to create sessions, and the invitations carry session descriptions that allow participants to agree on a set of compatible media types.

SIP provides signaling services for establishing and negotiating a secure and unsecured session but does not actually provide service offerings. SIP has many uses, including VoIP. Within the context of VoIP, SIP handles the call set up between devices and opens the lines, or streams, of communication. For example, a telecommunications system implementing SIP, may include a SIP client which initiates a SIP call set up with a "SIP server" directly with the server or through the "SIP router," thereafter followed by a handshaking procedure to open a communication dialogue. The SIP procedure can handle the connection and negotiate the session content. Once a SIP session is established, the SIP client can communicate with the SIP server. For example, the SIP client can run a VoiceXML program to send and receive voice data in an XML format from the SIP server. The SIP server can process the data and work with the SIP client to provide the requested voice service. SIP also makes use of the SIP routers to help route requests to a user's current location, authenticate and authorize users for services, implement provider call-routing policies, and provide features to users. SIP also provides a registration function that allows users to upload their current locations for use by the SIP routers.

In the VoIP context, there may be times when the SIP server's capacity is overloaded by processing and responding to an excessive number of requests in a short period of time. For example, suppose thousands of viewers of the television show American Idol called at roughly the same time to place their vote as to who should advance on the television show and these calls were attempted to be set-up with a particular SIP server. The processing capability of that particular SIP server may not be able to handle all these requests to set-up phone calls thereby causing the SIP server to be overloaded.

There have been attempts in handling overload situations described above. Typically, an upper and a lower threshold of the number of messages to be processed are used to determine if an overload condition occurs and when the overloaded condition no longer exists. For example, when the number of messages that are sent to the SIP server to be processed by the SIP server exceeds the upper threshold of the number of messages to be processed, then the SIP server is designated as being in an overload condition and will therefore limit the number of messages processed until the number of messages to be processed by the SIP is lower than the lower threshold.

However, implementing an upper and a lower threshold to handle overload situations may cause extreme fluctuations of messages to be processed by the SIP servers which can result in instabilities of the system. For example, since SIP uses unreliable messaging, an acknowledgment is required for each message received. If the sender of the message does not receive an acknowledgement, it resends the message. Hence, when the SIP server receives a number of messages that exceeds the upper threshold, it is deemed to be overloaded, and hence the number of messages to be processed is minimized thereby causing the SIP server to not send acknowledgements to some of the received messages. As a result, the overloaded SIP server will continue to receive these requests. The SIP server may not be able to process these requests unless the number of messages is below the lower threshold. The SIP router may then have these requests processed by other SIP servers since the SIP server is overloaded. However, these additional requests may cause the other SIP servers to become overloaded. Hence, the entire system could possibly become overloaded.

However, if instead of having extreme fluctuations of messages to be processed by the SIP server, there could be a smoother transition from the overload condition to the non-overload condition, then the possible instability of the system described above may be reduced.

Therefore, there is a need in the art for both limiting the load while also reducing the fluctuations in load at the SIP servers thereby reducing the possible instabilities of the system.

SUMMARY

The problems outlined above may at least in part be solved in some embodiments by using a ratio, referred to herein as the "deflator ratio," to predict the additional work required by a Session Initiation Protocol (SIP) server when the admission rate controller admits out-of-dialog messages (messages that attempt to start a communication or messages that are self-contained requests) to be serviced by the associated SIP server. Any out-of-dialog message may result in the flow of many further in-dialog messages (messages involved in an active communication session) if the out-of-dialog message becomes serviced by the SIP server thereby establishing a session with the SIP client as a result of that out-of-dialog message. The deflator ratio is a numerical representation of the ratio of in-dialog messages to out-of-dialog messages. By using the deflator ratio, the admission rate controller may compute the maximum number of out-of-dialog messages to be processed by the associated SIP server without overloading the SIP server thereby maximizing the processing capability of the SIP server.

Further, the admission rate controller within the SIP router may use a ratio, referred to herein as the "dampening ratio," for providing a smoother transition from the overload condition to the non-overload condition. The dampening ratio takes into account the excess number of messages processed by the SIP server that caused the SIP server to be in the overload condition. If the SIP server is significantly within an overload condition, then its associated admission rate controller within the SIP router, using the dampening ratio, significantly reduces the number of out-of-dialog messages to be sent to the SIP server. Conversely, if the SIP server is insignificantly within an overload condition, then its associated admission rate controller, using the dampening ratio, slightly reduces the number of out-of-dialog messages to be sent to the SIP server. In this manner, a smoother transition from the overload condition to the non-overload condition may occur.

In one embodiment of the present invention, a method for limiting extreme loads and reducing fluctuations in load at session servers, the method comprising the step of calculating a number of in-dialog messages received over a first fixed interval of time. The method further comprises calculating a number of out-of-dialog messages received over a second fixed interval of time. The method additionally comprises calculating a first ratio equal to an average number of the in-dialog messages received over the first fixed interval of time divided by an average number of the out-of-dialog messages received over the second fixed interval of time. Further, the method comprises calculating a second ratio equal to a maximum number of messages allowed over a period of time divided by a number of messages admitted on a previous interval of time. Additionally, the method comprises calculating a maximum number of the out-of-dialog messages to be sent to a particular server over the period of time based on the first ratio and the second ratio when an overload condition has been detected.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for limiting the load and reducing the fluctuations in load at session servers. In one embodiment of the present invention, an admission rate controller of a Session Initiation Protocol (SIP) router may calculate a ratio ("deflator ratio") equal to the average number of in-dialog messages received over a first fixed interval of time divided by the average number of out-of-dialog messages received over a second fixed interval of time. Further, the admission rate controller of the SIP router may calculate a ratio ("dampening ratio") equal to a maximum number of messages allowed over a period of time divided by the number of messages admitted on a previous interval of time. For a specific time interval, the admission rate controller calculates the maximum number of out-of-dialog messages to be sent to its associated SIP server based on the deflator and dampening ratios. The dampening ratio takes into account the excess number of messages processed by the SIP server that caused the SIP server to be in the overload condition. If the SIP server is significantly within an overload condition, then its associated admission rate controller within the SIP router, using the dampening ratio, significantly reduces the number of out-of-dialog messages to be sent to the SIP server. Conversely, if the SIP server is insignificantly within an overload condition, then its associated admission rate controller, using the dampening ratio, slightly reduces the number of out-of-dialog messages to be sent to the SIP server. In this manner, a smoother transition from the overload condition to the non-overload condition may occur.

While the following discusses the present invention in connection with implementing the Session Initiation Protocol (SIP), the principles of the present invention may be applied to other protocols that exhibit the same type of behavior as SIP, such as HyperText Transfer Protocol (HTTP) or a combination of SIP and HTTP. For example, a shopping cart application (e.g., Amazon.com) may use HTTP in a manner with similar characteristics as SIP. For instance, when a customer selects an item on a website to be purchased, a session is created and information about the customer is stored. Further, the communication exchanges (e.g., requests, responses) between the customer and the shopping cart application are "dialogs." Additionally, the shopping cart application may be overloaded with requests thereby causing the shopping cart application to reject new order requests but still continue to process existing requests. In another example, there can be a combination of SIP and HTTP protocols. For instance, a user may input information about a defective product on the manufacturer's website and then contact a repair specialist with VoIP using a link provided on the manufacturer's website. The repair specialist may receive the information inputted by the customer (session information from HTTP webpage) thereby more effectively assisting the customer.

A person of ordinary skill in the art would be capable of applying the principles of the present invention to such other protocols, such as HTTP and the combination of SIP and HTTP. Further, embodiments applying the principles of the present invention to such other protocols, such as HTTP and the combination of SIP and HTTP, would fall within the scope of the present invention.

Further, it is noted for clarity that the use of the term "session server" herein is to include servers implementing SIP as well as other protocols exhibiting the same type of behavior as SIP, such as HTTP and a combination of SIP and HTTP.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
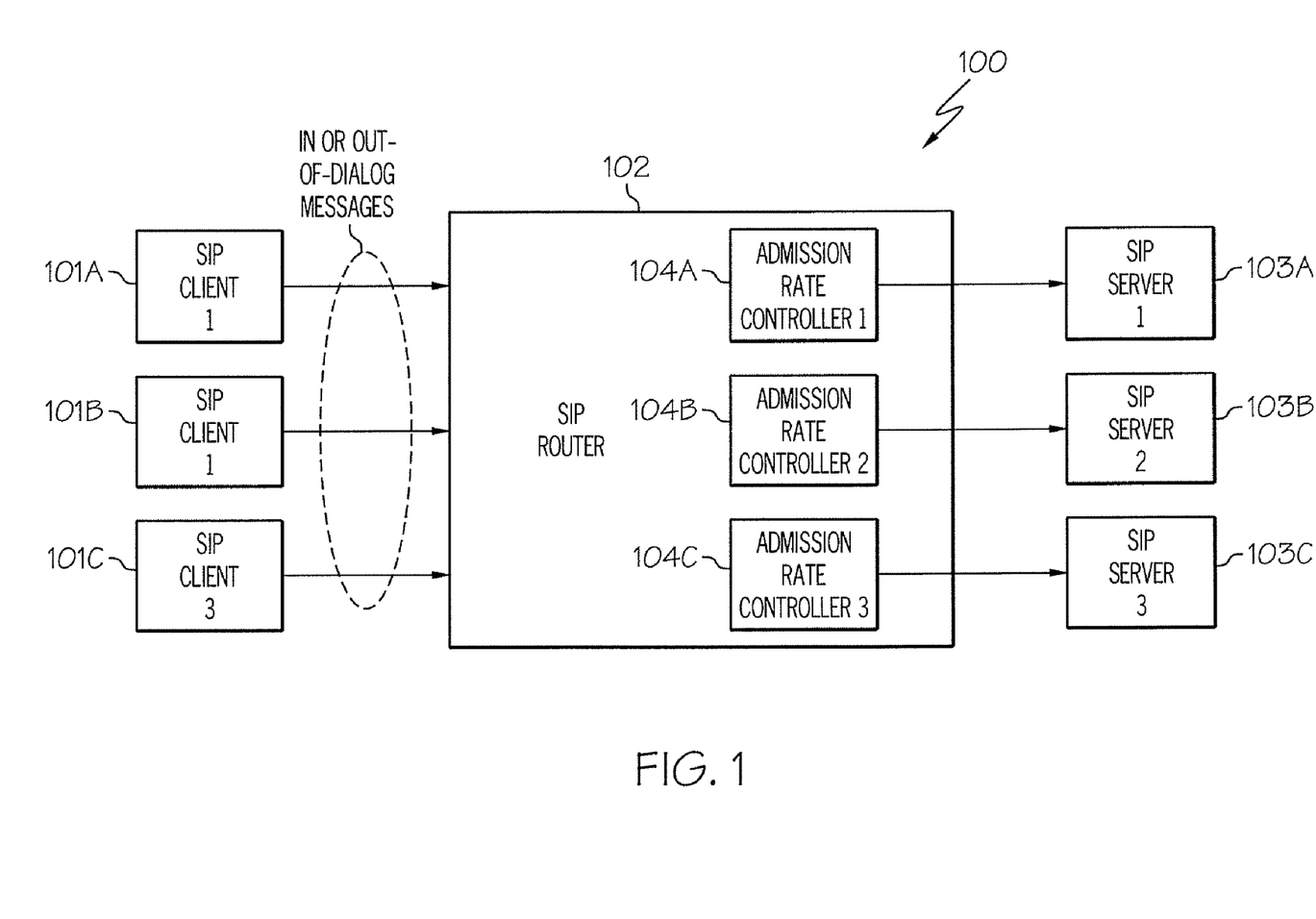
FIG. 1 illustrates a Session Initiation Protocol (SIP) service system in accordance with an embodiment of the present invention.

FIG. 1—SIP Service System

FIG. 1 illustrates an embodiment of the present invention of a Session Initiation Protocol (SIP) service system 100. SIP system 100 may include one or more SIP clients 101A-C. SIP clients 101A-C may collectively or individually be referred to as SIP clients 101 or SIP client 101, respectively. Each SIP client 101 may be connected to a SIP router 102 which may be connected to one or more SIP servers 103A-C. SIP servers 103A-C may collectively or individually be referred to as SIP servers 103 or SIP server 103, respectively. SIP client 101 can communicate directly with SIP server 103, or through SIP router 102. SIP server 103 can also be connected to other SIP compliant servers or SIP compliant devices not shown in FIG. 1. A description of the hardware configuration of SIP router 102 and SIP server 103 is provided further below in connection with FIG. 2. It is noted that system 100 may include any number of SIP clients 101, SIP routers 102 and SIP servers 103 and that FIG. 1 is illustrative.

Referring to FIG. 1, SIP client 101 can initiate a SIP call set-up with SIP server 103 directly with SIP server 103 or through SIP router 102, thereafter followed by a handshaking procedure to open a communication dialogue. The SIP procedure can handle the connection and negotiate the session content. Once a SIP session is established, SIP client 101 can communicate with SIP server 103. For example, SIP client 101 can run a VoiceXML program to send and receive voice data in an XML format from SIP server 103. SIP server 103 can process the data and work with SIP client 101 to provide the requested voice service. SIP also provides a registration function that allows users of SIP clients 101 to upload their current locations for use by SIP router 102.

Within SIP protocol, there are three types of messages that can be sent from SIP client 101. One type of message refers to those that attempt to start a communication session, or a "dialog," with SIP server 103. Another type of message refers to those messages that are self-contained requests and that do not start a communication session. For example, an information or register message may not require the start of a communication session. These first two types of messages may be referred to herein as "out-of-dialog" messages. The third type of message may refer to messages that are currently being sent and receive for an active communication session between SIP client 101 and SIP server 103. For example, INFO or BYE 3261 messages may be sent to SIP client 101 from SIP server 103 during a communication session with SIP server 103. These types of messages may be referred to herein as "in-dialog" messages.

As illustrated in FIG. 1, in-dialog messages as well as out-of-dialog messages may be sent from SIP client 101 to SIP router 102. SIP router 102 may then in turn transfer those messages to the appropriate SIP server 103.

SIP router 102 may be configured to control the flow of messages being sent to SIP servers 103. In one embodiment, SIP router 102 may include one or more "admission rate controllers" 104A-C used to control the flow of messages to its associated SIP servers 103. Admission rate controllers 104A-C may collectively or individually be referred to as admission rate controllers 104 or admission rate controller 104, respectively. In one embodiment, SIP router 102 may include an admission rate controller 104 designated for controlling the flow of messages to a designated SIP server 103. For example, admission rate controller 104A may be designated to control the flow of messages to SIP server 103A.

Figure 3:
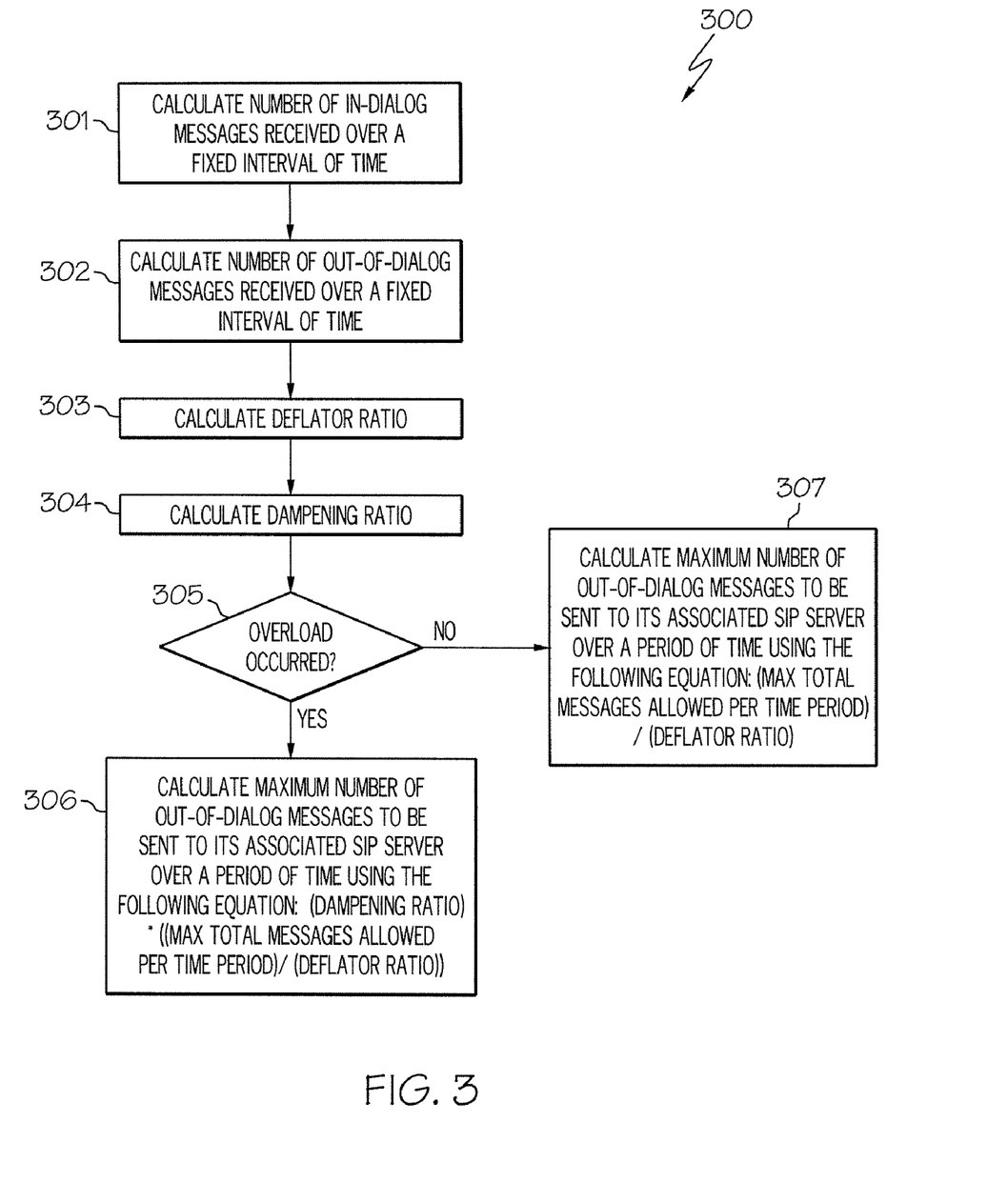
FIG. 3 is a flowchart of a method for limiting the load and reducing the fluctuations in load at the SIP servers in accordance with an embodiment of the present invention.
Figure 4:
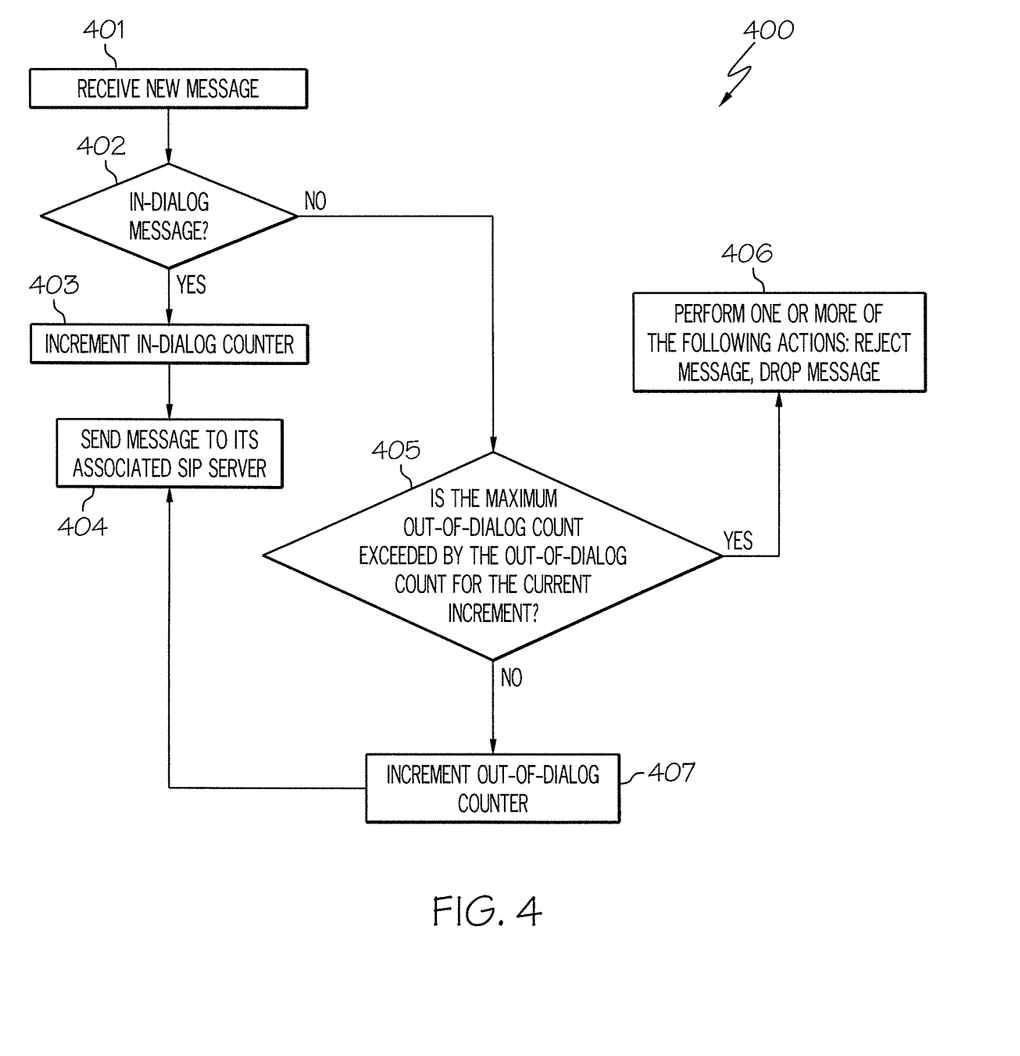
FIG. 4 is a flowchart of a method for operating on each inbound message received by the admission rate controller in connection with reducing the fluctuations in load at the SIP servers in accordance with an embodiment of the present invention.

As discussed in the Background Information section, implementing an upper and a lower threshold to handle overload situations may cause extreme fluctuations of messages to be processed by the SIP servers which can result in instabilities of the system. However, if instead of having extreme fluctuations of messages to be processed by the SIP server, there could be a smoother transition from the overload condition to the non-overload condition, then the possible instability of the system described above may be reduced. Therefore, there is a need in the art for reducing the fluctuations in load at the SIP servers thereby reducing the possible instabilities of the system. Admission rate controllers 104 may control the flow of messages to SIP servers 103 in such a manner as to both limit the load and reduce the fluctuations in load at SIP servers 103. In reducing the fluctuations in load at SIP servers 103, admission rate controllers 104 focus on controlling the flow of out-of-dialog messages as any disruption to the flow of in-dialog messages would result in the disruption of active calls. Hence, admission rate controllers 104 allow in-dialog messages to flow to the designated SIP servers 103; whereas, admission rate controllers 104 control the flow of out-of-dialog messages to the designated SIP servers 103 as discussed further below in connection with FIGS. 3-4. FIG. 3 is a flowchart of a method for limiting the load and reducing the fluctuations in load at the SIP servers 103. Further, FIG. 4 is a flowchart illustrating the operation of admission rate controllers 104 on each inbound message from SIP client 101.

Figure 2:
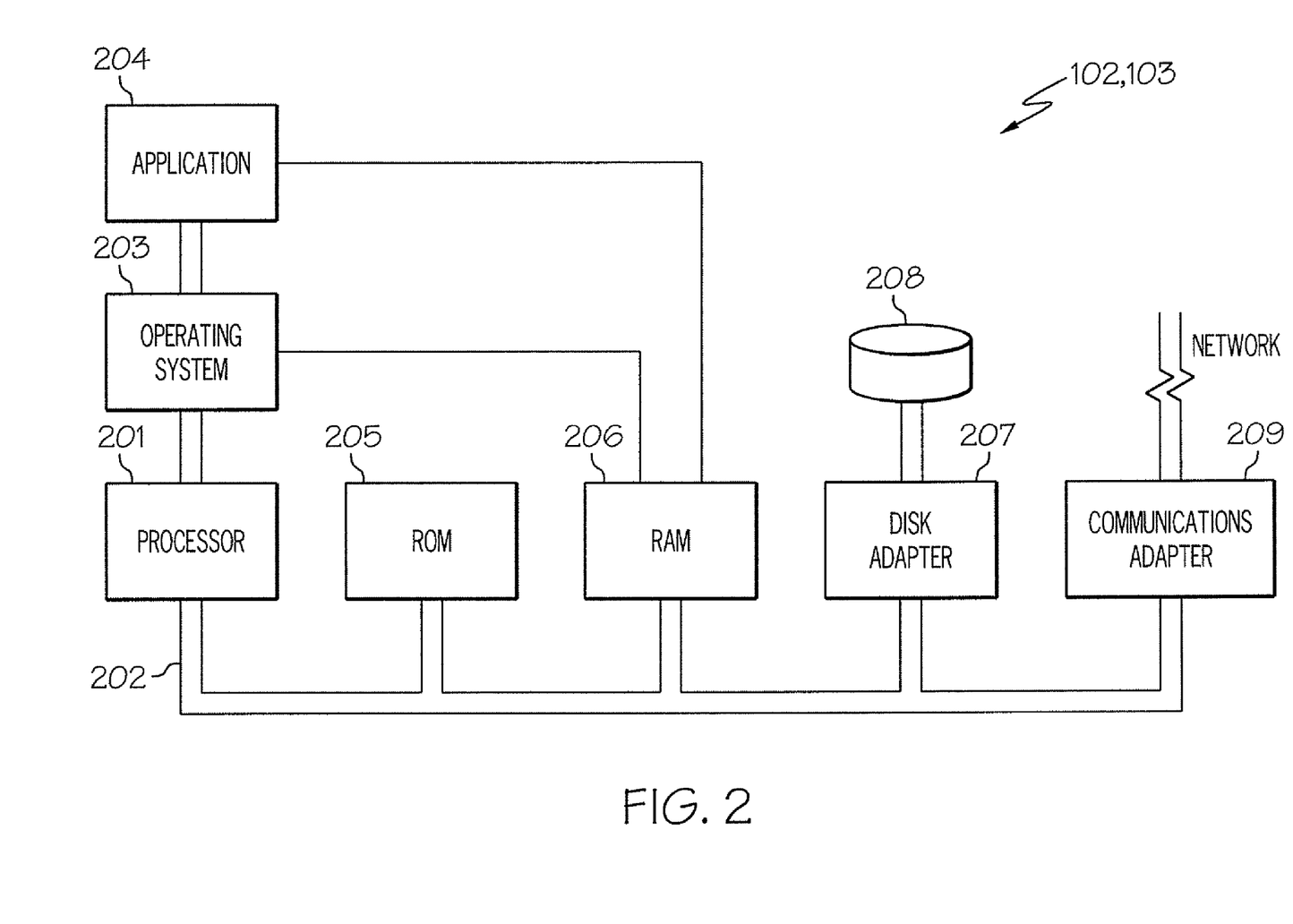
FIG. 2 illustrates a hardware configuration of a SIP router and a SIP server in accordance with an embodiment of the present invention.

As discussed above, a description of the hardware configuration of SIP router 102 and SIP server 103 is provided in connection with FIG. 2.

FIG. 2—SIP Router/SIP Server

FIG. 2 illustrates an embodiment of a hardware configuration of a SIP router 102 (FIG. 1) and SIP server 103 (FIG. 1) which is representative of a hardware environment for practicing the present invention. SIP router 102, SIP server 103 may have a processor 201 coupled to various other components by system bus 202. An operating system 203 may run on processor 201 and provide control and coordinate the functions of the various components of FIG. 2. An application 204 in accordance with the principles of the present invention may run in conjunction with operating system 203 and provide calls to operating system 203 where the calls implement the various functions or services to be performed by application 204. Application 204 for SIP router 102 may include, for example, a software implementation of admission rate controller 104 (FIG. 1) configured to reduce, at least in part, the fluctuations in load at SIP servers 103, as discussed further below in association with FIGS. 3-4. Further, the software implementation of admission rate controller 104 may include counters configured to count the number of in-dialog messages ("in-dialog counter") or the number of out-of-dialog messages ("out-of-dialog counter") that were received and/or sent to its associated SIP server 103, as discussed further below in association with FIG. 4. Further, application 204 for SIP router 102 may include an application for stabilizing system 100 (FIG. 1) in a more efficient manner when either SIP router 102 or SIP server 103 fails, as discussed further below in association with FIG. 5.

Referring to FIG. 2, Read-Only Memory (ROM) 205 may be coupled to system bus 202 and include a basic input/output system ("BIOS") that controls certain basic functions of SIP router 102, SIP server 103. Random access memory (RAM) 206 and disk adapter 207 may also be coupled to system bus 202. It should be noted that software components including operating system 203 and application 204 may be loaded into RAM 206, which may be SIP router's 102, SIP server's 103 main memory for execution. Disk adapter 207 may be an integrated drive electronics ("IDE") adapter that communicates with a disk unit 208, e.g., disk drive. It is noted that the software implementation of admission rate controller 104, as discussed further below in association with FIGS. 3-4, and the program for stabilizing system 100 in a more efficient manner, as discussed further below in association with FIG. 5, may reside in disk unit 208 or in application 204.

Referring to FIG. 2, computer system 107 may further include a communications adapter 209 coupled to bus 202. Communications adapter 209 may interconnect bus 202 with an outside network (not shown) thereby allowing SIP router 102, SIP server 103 to communicate amongst each other as well as with SIP client 101 (FIG. 1).

The various aspects, features, embodiments or implementations of the invention described herein can be used alone or in various combinations. The methods of the present invention can be implemented by software, hardware or a combination of hardware and software. The present invention can also be embodied as computer readable code on a computer readable medium. The computer readable medium is any data storage device that can store data which can thereafter be read by a computer system. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

FIG. 3—Method for Limiting the Load and Reducing Fluctuations in Load at SIP Servers FIG. 3 is a flowchart of a method 300 for limiting the load and reducing the fluctuations in load at SIP servers 103 (FIG. 1) in accordance with an embodiment of the present invention.

Referring to FIG. 3, in conjunction with FIGS. 1-2, in step 301, admission rate controller 104 calculates the number of in-dialog messages received over a fixed interval of time. In one embodiment, an in-dialog counter is used to count the number of in-dialog messages received over a fixed interval of time. In one embodiment, the in-dialog counter may be configured in software or hardware and may reside within admission rate controller 104 or within SIP router 102. In step 302, admission rate controller 104 calculates the number of out-of-dialog messages received over a fixed interval of time. In one embodiment, an out-of-dialog counter is used to count the number of out-of-dialog messages received over a fixed interval of time. In one embodiment, the out-of-dialog counter may be configured in software or hardware and may reside within admission rate controller 104 or within SIP router 102. It is noted that the fixed interval of times used in steps 301 and 302 may be the same or different.

In step 303, admission rate controller 104 calculates a ratio, referred to herein as the "deflator ratio," which corresponds to the following equation (EQ1):

Deflator Ratio=(in-dialog message average)/(out-of-dialog message average)

The in-dialog message average refers to the number of in-dialog messages received over a fixed interval of time that was calculated in step 301. The out-of-dialog message refers to the number of out-of-dialog messages received over a fixed interval of time that was calculated in step 302. It is noted for clarity that the fixed interval of time used for calculating the in-dialog message average may either be the same or different from the fixed interval of time used for calculating the out-of-dialog message average.

The "deflator ratio" is used to predict the additional work required by SIP server 103 (referring to SIP server 103 associated with admission rate controller 104) when admission rate controller 104 admits out-of-dialog messages to be serviced by its associated SIP server 103. Any out-of-dialog message may result in the flow of many further in-dialog messages if the out-of-dialog message becomes serviced by SIP server 103 thereby establishing a session with SIP client 101 as a result of that out-of-dialog message. The deflator ratio is a numerical representation of this SIP phenomenon. Further, the deflator ratio is self-adjusting over time to the new or changing call flows.

In step 304, admission rate controller 104 calculates a ratio, referred to herein as the "dampening ratio," which corresponds to the following equation (EQ2):

Dampening Ratio=(maximum total messages allowed per time period)/(total messages admitted on previous time period)

The maximum total messages allowed per time period refers to the total number of in-dialog messages and out-of-dialog messages that are allowed over a time period (e.g., 1 second). The total messages admitted on the previous time period refers to the total number of in-dialog messages and out-of-dialog messages that were sent by admission rate controller 104 to its associated SIP server 103 during the last time period (e.g., 1 second).

In cases in which there an "overload condition" occurred, the "dampening ratio" may be used to smooth the transition back to the non-overload condition. The "overload condition" may refer to the situation where the number of total messages (both in-dialog messages and out-of-dialog messages) received by SIP server 103 over a time period exceeded a designated threshold number of total messages. The designated threshold number of total messages corresponds to the maximum total messages allowed per time period as discussed above. A "non-overload condition" may refer to the situation where the number of total messages (both in-dialog messages and out-of-dialog messages) received by SIP server 103 does not exceed the maximum total messages allowed per time period.

As stated in the Background Information section, as a result of an overload condition, there may be extreme fluctuations of messages to be processed by the SIP server which could result in the possible instability of the system. If there could be a smoother transition from the overload condition to the non-overload condition, then the possible instability of the system described above may be reduced. The dampening ratio, as discussed below, may be used to provide a smoother transition from the overload condition to the non-overload condition.

The dampening ratio takes into account the excess number of messages processed by SIP server 103 that caused SIP server 103 to be in an overload condition. If SIP server 103 processed a significantly large number of messages in excess of the maximum number of messages that are to be processed within a non-overload condition, then the dampening ratio will cause admission rate controller 104 to reduce the number of out-of-dialog messages to be sent to SIP server 103 to a greater extent than in the case when SIP server 103 processed a small number of messages in excess of the maximum number of messages that are to be processed within the non-overload condition. That is, the dampening ratio may be used to bring back SIP server 103 from its overload condition in a proportional manner. If SIP server 103 is significantly within an overload condition, then admission rate controller 104, using the dampening ratio, significantly reduces the number of out-of-dialog messages to be sent to SIP server 103. Conversely, if SIP server 103 is insignificantly within an overload condition, then admission rate controller 104, using the dampening ratio, slightly reduces the number of out-of-dialog messages to be sent to SIP server 103.

In step 305, admission rate controller 104 determines whether an overload condition occurred for its associated SIP server 103. In one embodiment, admission rate controller 104 determines that an overload condition occurred if the total number of messages (both in-dialog messages and out-of-dialog messages) received by SIP server 103 over the previous time period (e.g., 1 second) exceeded the maximum number of messages to be processed by SIP server 103 over that same time duration (e.g., 1 second).

If an overload condition has occurred, then, in step 306, admission rate controller 104 uses the dampening ratio, as discussed above, to calculate the maximum number of out-of-dialog messages to be sent to its associated SIP server 103 over a period of time (e.g., 1 second) using the following equation (EQ3):

Maximum number of out-of-dialog messages to be sent to its associated SIP server over a period of time=(dampening ratio)*((max total messages allowed per time period)/(deflator ratio))

In this manner, the number of out-of-dialog messages to be processed by SIP server 103 will be proportional to the degree in which SIP server 103 is in the overload condition. By admitting out-of-dialog messages to its associated SIP server 103 in this manner, SIP server 103 will have a smoother transition to the non-overload condition from the overload condition thereby reducing the possible instability of the system and improving the efficiency of the processing capability of SIP server 103.

If, however, there is not an overload condition, then in step 307, admission rate controller 104 calculates the maximum number of out-of-dialog messages to be sent to its associated SIP server 103 over a period of time (e.g., 1 second) using the following equation (EQ4):

Maximum number of out-of-dialog messages to be sent to its associated SIP server over a period of time=(max total messages allowed per time period)/(deflator ratio)

In this manner, admission rate controller 104 will be able to know the number of out-of-dialog messages that can be sent to its associated SIP server 103 to maximize its processing capability while having a low probability of entering into an overload condition during the next time period (e.g., next 1 second).

Method 300 may include other and/or additional steps that, for clarity, are not depicted. Further, method 300 may be executed in a different order presented and that the order presented in the discussion of FIG. 3 is illustrative. Additionally, certain steps in method 300 may be executed in a substantially simultaneous manner or may be omitted.

The operation of admission rate controller 104 on each inbound message in connection with reducing fluctuations in load at SIP servers 103 is discussed below in connection with FIG. 4.

FIG. 4—Method for Operating on Each Inbound Message in Connection with Reducing Fluctuations in Load at SIP Servers FIG. 4 is a flowchart of a method 400 for operating on each inbound message (i.e., each in-dialog and out-of-dialog message) received by admission rate controller 104 in connection with reducing the fluctuations in load at SIP servers 103 (FIG. 1) in accordance with an embodiment of the present invention.

Referring to FIG. 4, in conjunction with FIGS. 1-2, in step 401, admission rate controller 104 receives a new message. In step 402, admission rate controller 104 determines whether the newly received message is an in-dialog message.

If the newly received message is an in-dialog message, then, in step 403, admission rate controller 104 increments an in-dialog counter. The in-dialog counter is configured to count the number of received in-dialog messages over a period of time. The in-dialog counter may be implemented in either software (e.g., application 204) or hardware. Further, the in-dialog counter may be reset by admission rate controller 104 after a period of time (e.g., 1 second) has expired thereby allowing the in-dialog counter to count the number of received in-dialog messages during a particular period of time (e.g., 1 second). Upon incrementing the in-dialog counter, admission rate controller, in step 404, sends the in-dialog message to its associated SIP server 103.

If, however, the newly received message is not an in-dialog message (in which the newly received message is an out-of-dialog message), then, in step 405, admission rate controller 104 determines whether the maximum out-of-dialog count exceeds the out-of-dialog count for the current increment. That is, in step 405, admission rate controller 104 determines if the current count for the out-of-dialog counter exceeds a threshold number. In this manner, admission rate controller 104 determines if there is an excess number of out-of-dialog messages being sent to its associated SIP server 103 to be processed.

If the current count for the out-of-dialog counter exceeds a threshold number, then, in step 406, admission rate controller 104 performs one of the following actions: rejecting the message which may include an error message; and dropping the message.

If, however, the current count for the out-of-dialog counter does not exceed the threshold number, then, in step 407, admission rate controller 104 increments the out-of-dialog counter. The out-of-dialog counter is configured to count the number of received out-of-dialog messages over a period of time. The out-of-dialog counter may be implemented in either software (e.g., application 204) or hardware. Further, the out-of-dialog counter may be reset by admission rate controller 104 after a period of time (e.g., 1 second) has expired thereby allowing the out-of-dialog counter to count the number of received out-of-dialog messages during a particular period of time (e.g., 1 second). Upon incrementing the out-of-dialog counter, admission rate controller, in step 404, sends the out-of-dialog message to its associated SIP server 103.

Method 400 may include other and/or additional steps that, for clarity, are not depicted. Further, method 400 may be executed in a different order presented and that the order presented in the discussion of FIG. 4 is illustrative. Additionally, certain steps in method 400 may be executed in a substantially simultaneous manner or may be omitted.

Referring to FIG. 1, when SIP server 103 or SIP router 102 fails, the increased load may be absorbed by the surviving SIP servers 103 and SIP routers 102. For example, when SIP server 103A fails, all dialogs maintained by SIP server 103A are moved to a different SIP server 103, such as SIP server 103B. These dialog messages appear to the surviving SIP server 103 to be in-dialog messages even though admission controller 104 for this surviving SIP server 103 did not witness the associated out-of-dialog messages. As a result, the deflator ratio (EQ1) for the surviving SIP server 103 (e.g., SIP server 103B) may become inaccurate. For instance, admission rate controller 104 (e.g., admission rate controller 104B) will increment the in-dialog counter for its associated SIP server 103 (e.g., SIP server 103B) for the dialogs that were taken over by the surviving SIP server 103 (e.g., SIP server 103B); however, admission rate controller 104 does not increment the out-of-dialog counter for its associated SIP server 103 (e.g., SIP server 103B) for the out-of-dialog messages that started the dialogs. As a result, the deflator ratio unnecessarily increases which reduces the number of new dialogs that can be created. Calls may be unnecessarily rejected due to the inaccurate deflator ratio.

Figure 5:
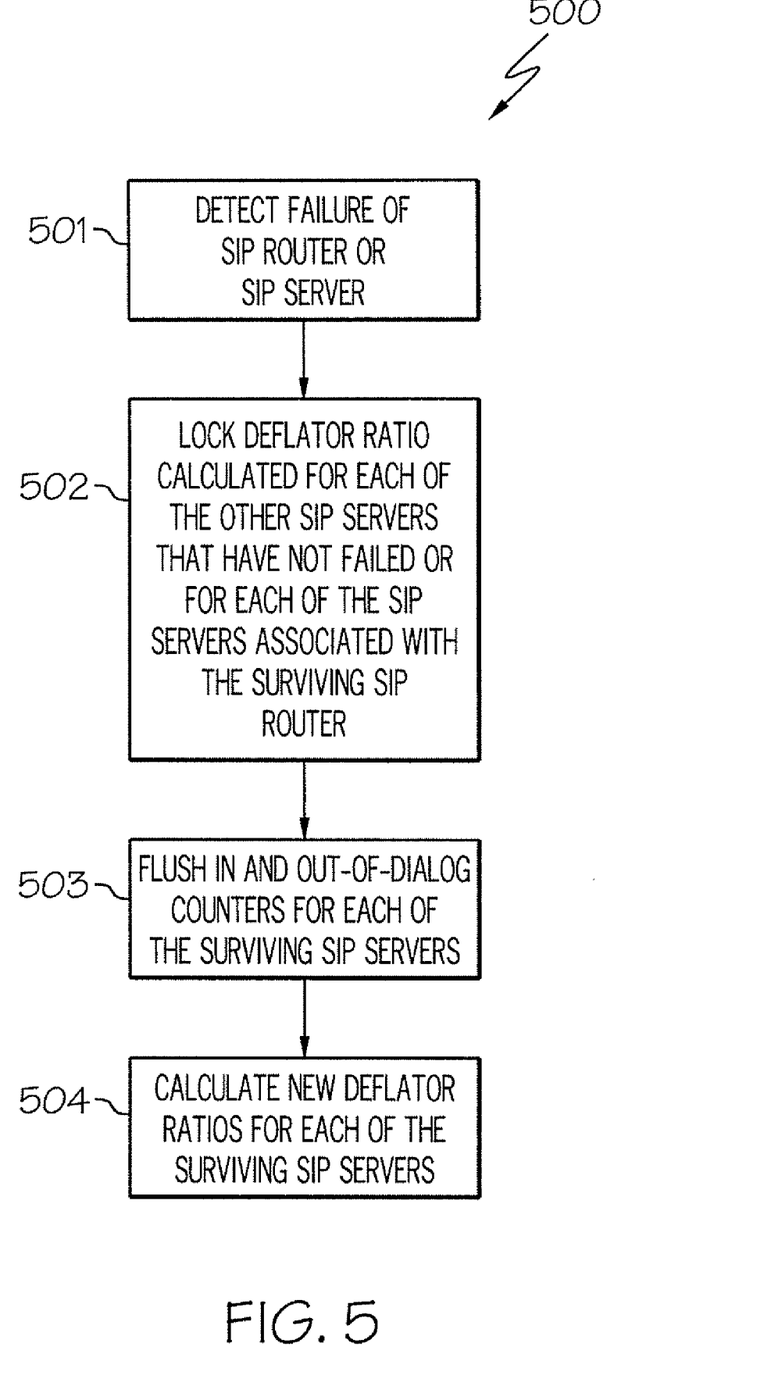
FIG. 5 is a flowchart of a method for improving the accuracy of the deflator ratio after the failure of the SIP server or the SIP router in accordance with an embodiment of the present invention.

If, however, the deflator ratio could be more accurate after the failure of SIP server 103 or SIP router 102, then fewer out-of-dialog messages (i.e., fewer calls) will be rejected during the transitional period until system 100 stabilizes. A method for improving the accuracy of the deflator ratio after the failure of SIP server 103 or SIP router 102 is discussed below in connection with FIG. 5. FIG. 5 is a flowchart of a method for improving the accuracy of the deflator ratio after the failure of SIP server 103 or SIP router 102.

FIG. 5—Method for Improving the Accuracy of the Deflator Ratio After the Failure of SIP Server or SIP Router FIG. 5 is a flowchart of a method 500 for improving the accuracy of the deflator ratio (EQ1) after the failure of SIP server 103 (FIG. 1) or SIP router 102 (FIG. 1) in accordance with an embodiment of the present invention.

Referring to FIG. 5, in conjunction with FIGS. 1-2, in step 501, admission rate controller 104 detects a failure of SIP server 103 or SIP router 102.

In step 502, when a SIP server 103 has failed, admission rate controller 104 locks the deflator ratio calculated for each of the other SIP servers 103 that have not failed. Alternatively, when a SIP router 102 has failed, admission rate controller 104 locks the deflator ratio calculated for each of the SIP servers 103 associated with a surviving SIP router 102. SIP servers 103 that have not failed and SIP servers 103 associated with the surviving SIP router 102 may individually be referred to herein as the "surviving SIP servers 103."

By locking the deflator ratio, the deflator ratio will not be unnecessarily increased when one of the surviving SIP servers 103 takes over the dialogs that were being processed by the failed SIP server 103 or failed SIP router 102.

In step 503, admission rate controller 104 flushes the in and out-of-dialog counters for each of the surviving SIP servers 103. In step 504, admission rate controller 104 calculates the new deflator ratio for each of the surviving SIP servers 103. In this manner, the appropriate deflator ratio will be used by the SIP servers 103 that have not failed thereby reducing the number of out-of-dialog messages (i.e., fewer calls) that will be rejected during the transitional period until system 100 stabilizes.

Method 500 may include other and/or additional steps that, for clarity, are not depicted. Further, method 500 may be executed in a different order presented and that the order presented in the discussion of FIG. 5 is illustrative. Additionally, certain steps in method 500 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for limiting extreme loads and reducing fluctuations in load at session servers, the method comprising the steps of:
   calculating a number of in-dialog messages received over a first fixed interval of time;
   calculating a number of out-of-dialog messages received over a second fixed interval of time;
   determining a first ratio equal to an average number of said in-dialog messages received over said first fixed interval of time divided by an average number of said out-of-dialog messages received over said second fixed interval of time;
   determining a second ratio equal to a maximum number of messages allowed over a period of time divided by a number of messages admitted on a previous interval of time; and
   calculating, by an admission rate controller of a router, a maximum number of said out-of-dialog messages to be sent to a particular session server over said period of time based on said first ratio and said second ratio when an overload condition has been detected.

2. The method as recited in claim 1, wherein said maximum number of said out-of-dialog messages to be sent to said particular session server over said period of time when said overload condition is detected is equal to the following equation:

$$\text{said second ratio} * ((\text{said maximum number of messages allowed over said period of time}) / \text{said first ratio}).$$

3. The method as recited in claim 1 further comprising the step of:
   calculating a maximum number of said out-of-dialog messages to be sent to said particular session server over said period of time based on said maximum number of messages allowed over said period of time and said first ratio when said overload condition has not been detected.

4. The method as recited in claim 1, wherein said particular session server corresponds to a server implementing Session Initiation Protocol.

5. The method as recited in claim 1, wherein said particular session server corresponds to a server implementing HyperText Transfer Protocol.

6. The method as recited in claim 1 further comprising the steps of:
   receiving an out-of-dialog message; and
   performing one of the following actions when said out-of-dialog message is received and a count of out-of-dialog messages received exceeds a threshold: rejecting said out-of-dialog message, dropping said out-of-dialog message.

7. The method as recited in claim 1 further comprising the steps of:
  detecting a failure of one of a SIP router and a SIP server;
  locking said first ratio calculated for each surviving SIP server;
  flushing in-dialog counters and out-of-dialog counters for each surviving SIP server; and
  calculating a new said first ratio for each surviving SIP server.

8. A system, comprising:
  a memory unit for storing a computer program for limiting extreme loads and reducing fluctuations in load at session servers; and
  a processor coupled to said memory unit, wherein said processor, responsive to said computer program, comprises:
    circuitry for calculating a number of in-dialog messages received over a first fixed interval of time;
    circuitry for calculating a number of out-of-dialog messages received over a second fixed interval of time;
    circuitry for calculating a first ratio equal to an average number of said in-dialog messages received over said first fixed interval of time divided by an average number of said out-of-dialog messages received over said second fixed interval of time;
    circuitry for calculating a second ratio equal to a maximum number of messages allowed over a period of time divided by a number of messages admitted on a previous interval of time; and
    circuitry for calculating a maximum number of said out-of-dialog messages to be sent to a particular session server over said first period of time based on said first ratio and said second ratio when an overload condition has been detected.

9. The system as recited in claim 8, wherein said maximum number of said out-of-dialog messages to be sent to said particular session server over said period of time when said overload condition is detected is equal to the following equation:

said second ratio * ((said maximum number of messages allowed over said period of time) / said first ratio).

10. The system as recited in claim 8, wherein said processor further comprises:
  circuitry for calculating a maximum number of said out-of-dialog messages to be sent to said particular session server over said period of time based on said maximum number of messages allowed over said period of time and said first ratio when said overload condition has not been detected.

11. The system as recited in claim 8, wherein said particular session server corresponds to a server implementing Session Initiation Protocol.

12. The system as recited in claim 8, wherein said particular session server corresponds to a server implementing HyperText Transfer Protocol.

13. The system as recited in claim 8, wherein said processor further comprises:
  circuitry for receiving an out-of-dialog message; and
  circuitry for performing one of the following actions when said out-of-dialog message is received and a count of out-of-dialog messages received exceeds a threshold: rejecting said out-of-dialog message, dropping said out-of-dialog message.

14. The system as recited in claim 8, wherein said processor further comprises:
  circuitry for detecting a failure of one of a SIP router and a SIP server;
  circuitry for locking said first ratio calculated for each surviving SIP server;
  circuitry for flushing in-dialog counters and out-of-dialog counters for each surviving SIP server; and
  circuitry for calculating a new said first ratio for each surviving SIP server.

15. A computer program product embodied in a computer readable storage medium for limiting extreme loads and reducing fluctuations in load at session servers, the computer program product comprising the programming steps of:
  calculating a number of in-dialog messages received over a first fixed interval of time;
  calculating a number of out-of-dialog messages received over a second fixed interval of time;
  calculating a first ratio equal to an average number of said in-dialog messages received over said first fixed interval of time divided by an average number of said out-of-dialog messages received over said second fixed interval of time;
  calculating a second ratio equal to a maximum number of messages allowed over a period of time divided by a number of messages admitted on a previous interval of time; and
  calculating a maximum number of said out-of-dialog messages to be sent to a particular session server over said period of time based on said first ratio and said second ratio when an overload condition has been detected.

16. The computer program product as recited in claim 15, wherein said maximum number of said out-of-dialog messages to be sent to said particular session server over said period of time when said overload condition is detected is equal to the following equation:

said second ratio * ((said maximum number of messages allowed over said period of time) / said first ratio).

17. The computer program product as recited in claim 15 further comprising the programming step of:
  calculating a maximum number of said out-of-dialog messages to be sent to said particular session server over said period of time based on said maximum number of messages allowed over said period of time and said first ratio when said overload condition has not been detected.

18. The computer program product as recited in claim 15, wherein said particular session server corresponds to a server implementing Session Initiation Protocol.

19. The computer program product as recited in claim 15 further comprising the programming steps of:
  receiving an out-of-dialog message; and
  performing one of the following actions when said out-of-dialog message is received and a count of out-of-dialog messages received exceeds a threshold: rejecting said out-of-dialog message, dropping said out-of-dialog message.

20. The computer program product as recited in claim 15 further comprising the programming steps of:
  detecting a failure of one of a SIP router and a SIP server;
  locking said first ratio calculated for each surviving SIP server;
  flushing in-dialog counters and out-of-dialog counters for each surviving SIP server; and
  calculating a new said first ratio for each surviving SIP server.

* * * * *